US007645468B2

(12) United States Patent
Schweizer et al.

(10) Patent No.: US 7,645,468 B2
(45) Date of Patent: *Jan. 12, 2010

(54) OIL SEED MEAL PREPARATION

(75) Inventors: Martin Schweizer, Winnipeg (CA); Brent E. Green, Winnipeg (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 860 days.

This patent is subject to a terminal disclaimer.

(21) Appl. No.: 10/871,065

(22) Filed: Jun. 21, 2004

(65) Prior Publication Data

US 2005/0031767 A1 Feb. 10, 2005

Related U.S. Application Data

(60) Provisional application No. 60/479,852, filed on Jun. 20, 2003.

(51) Int. Cl.
*A61K 36/00* (2006.01)
*A61K 47/00* (2006.01)
*A61K 9/00* (2006.01)
*A01N 65/00* (2006.01)

(52) U.S. Cl. ............... 424/776; 424/725; 424/400; 424/439

(58) Field of Classification Search ................. None
See application file for complete search history.

(56) References Cited

U.S. PATENT DOCUMENTS

| 3,966,702 | A | * | 6/1976 | Carey | 530/378 |
| 4,158,656 | A | * | 6/1979 | Jones et al. | 530/377 |
| 5,844,086 | A | * | 12/1998 | Murray | 530/377 |
| 6,005,076 | A | * | 12/1999 | Murray | 530/377 |
| 6,808,621 | B1 | * | 10/2004 | Cisneros | 208/133 |
| 6,955,831 | B2 | * | 10/2005 | Higgs et al. | 426/630 |

FOREIGN PATENT DOCUMENTS

| CA | 2335745 | 8/2002 |
| GB | 1 428 076 | 3/1976 |
| GB | 1428076 | 3/1976 |
| WO | WO 01/84949 | 11/2001 |
| WO | WO 03/053157 | 7/2003 |

OTHER PUBLICATIONS

Owusu-Ansah J.Y. et al., Mirowave Inactivation of Myrosinase in Canola Seeds: A Pilot Plant Study. vol. 56 No. 5, 1991 pp. 1372-1375.
Wang, X. et al., Thermal Inactivation of Myrosinase in Yellow Mustard Seed. vol. 3(3):pp. 879-886 (1994).
Maheshwari N.P. et al., Mirowave Treatment of Dehulled Rapeseed to Inactivate Myrosinase and its Effect on Oil and Meal Quality. (1980) pp. 194-199.
Kozlowska, J.H. et al., Characterisation of myrosinase in Polish Varieties of Rapeseed. 91983), 34, pp. 1171-1178.
Rauchberger, Y. et al., The Effect of Aqueous leaching of Glucosinolates on the Nutritive Quality of Rapeseed Meal. (1979), 30, pp. 30-39.
Naczk, Marian et al., Condensed Tannins in Canola Hulls. J. Agric. Food Chem. (1994), 42, pp. 1296-2200.
Amarowicz, R. et al., Antioxidant Activity of Crude Tannins of Canada and Rapeseed Hulls. vol. 77, No. 9 (2000) pp. 957-961.
Shahidi, F. et al., Glucosinalates in Brassica Oilseeds: Processing Effects and Extraction. (1997) pp. 152-171.
McCurdy, M. Sandra, Infrared Processing of Dry Peas, Canola, and Canola Screenings. vol. 57, No. 4, 1992, pp. 941-944.

* cited by examiner

*Primary Examiner*—Christopher R Tate
*Assistant Examiner*—Randall Winston
(74) *Attorney, Agent, or Firm*—Michael I. Stewart; Sim & McBurney

(57) ABSTRACT

Canola oil seeds are treated for the production of a canola oil seed meal for recovery of canola protein isolates therefrom. The canola oil seeds are heat-treated to inactivate myrosinases and other enzymes and dehulled prior to crushing dehulled canola oil seeds and removing oil therefrom and to provide the canola oil seed meal.

27 Claims, 4 Drawing Sheets

FIG.3 Flow chart for typical Canola protein isolation process

Temperature profiles for heat treatment of canola seed and dehulled meat fractions

OIL SEED MEAL PREPARATION

FIELD OF INVENTION

The invention is directed to the preparation of oil seed meal for the recovery of protein therefrom.

BACKGROUND OF THE INVENTION

In copending U.S. patent application Ser. Nos. 10/137,391 filed May 3, 2002 (WO 02/089597) and 10/476,230 filed Jun. 9, 2004, all assigned to the assignee hereof and the disclosures of which are incorporated herein by reference, there is described a process for producing a protein isolate of high purity, containing at least about 100 wt % protein when determined by the Kjeldahl or equivalent method as percent nitrogen (N) and multiplied by a conversion factor of 6.25. As used herein, the term "protein content" refers to the quantity of protein in the protein isolate expressed on a dry weight basis. In the aforementioned U.S. Patent Applications, the protein isolate is made by a process in which oil seed meal is extracted with a food grade salt solution, the resulting protein solution, after an initial treatment with a colourant adsorbent, if desired, is concentrated to a protein content of at least about 200 g/L, and the concentrated protein solution is diluted in chilled water to form protein micelles, which are allowed to settle to form an aggregated, coalesced, dense amorphous, sticky gluten-like protein isolate mass, termed "protein micellar mass" or PMM, which is separated from residual aqueous phase and may be used as such or dried.

In one embodiment of the process described above and as specifically described in U.S. patent application Ser. Nos. 10/137,391 and 10/476,230, the supernatant from the PMM settling step is processed to recover a protein isolate comprising dried protein from wet PMM and supernatant. This procedure may be effected by initially concentrating the supernatant using ultrafiltration membranes, mixing the concentrated supernatant with the wet PMM and drying the mixture. The resulting canola protein isolate has a high purity of at least about 90 wt %, preferably at least about 100 wt %, protein (N×6.25).

In another embodiment of the process described above and as specifically described in application Ser. Nos. 10/137,391 and 10/476,230, the supernatant from the PMM settling step is processed to recover a protein from the supernatant. This procedure may be effected by initially concentrating the supernatant using ultrafiltration membranes and drying the concentrate. The resulting canola protein isolate has a high purity of at least about 90 wt %, preferably at least about 100 wt %, protein (N×6.25).

The procedures described in the aforementioned US Patent Applications are essentially batch procedures. In copending U.S. patent application Ser. No. 10/298,678 filed Nov. 19, 2002 (WO 03/043439), assigned to the assignee hereof and the disclosures of which are incorporated herein by reference, there is described a continuous process for making canola protein isolates. In accordance therewith, canola oil seed meal is continuously mixed with a salt solution, the mixture is conveyed through a pipe while extracting protein from the canola oil seed meal to form an aqueous protein solution, the aqueous protein solution is continuously separated from residual canola oil seed meal, the aqueous protein solution is continuously conveyed through a selective membrane operation to increase the protein content of the aqueous protein solution to at least about 200 g/L while maintaining the ionic strength substantially constant, the resulting concentrated protein solution is continuously mixed with chilled water to cause the formation of protein micelles, and the protein micelles are continuously permitted to settle while the supernatant is continuously overflowed until the desired amount of PMM has accumulated in the settling vessel. The PMM is removed from the settling vessel and may be dried. The PMM has a protein content of at least about 90 wt % (N×6.25), preferably at least about 100 wt %.

The meal which is extracted at the initial step in the preparation of the protein isolate contains a number of components which can contribute to the taste and colour of the protein isolate. For example, there are hull particles that contain certain phenolic compounds which may leach into the extract. Such phenolic compounds are prone to oxidation to form coloured compounds.

Other components which may contribute to the quality of the meal and its products are glucosinolates and the products of their degradation. Degradation of glucosinolates is catalyzed by degrative enzymes called myrosinases, which break down glucosinolates into isothyocyanates, thiocyanates, nitriles and elemental sulfur. The degradation products of glucosinolates reduce the value of glucosinolate containing plants when used as food for humans or for feeding animals.

Canola is also known as rapeseed or oil seed rape.

SUMMARY OF THE INVENTION

In the present invention, canola oil seeds, are subjected to heat treatment to inactivate the myrosinases and to dehulling prior to crushing the dehulled oil seeds to remove oil therefrom. The procedure minimizes the presence of components in the meal which adversely affect colour and taste of the protein isolate derived from the oil seed meal using the processes described above. The heat treatment procedure provided herein also may be used to deactivate other enzymes which may be present in the oil seed.

The inactivation of myrosinases and other enzymes present in the canola oil seeds may be effected in any convenient manner consistent with inactivation of the enzymes. Most conveniently, the inactivation is carried out using steam at approximately 90° C. for a minimum of 10 minutes, although other temperatures, times and procedures may be used, for example, the use of infra-red, microwave or radio frequency treatment. The important feature is that the enzymes, including the myrosinases, are inactivated.

Accordingly, in one aspect of the present invention, there is provided a method of forming a canola oil seed meal, which comprises heat treating the canola oil seeds to deactivate enzymes therein, dehulling the canola oil seeds, and removing canola oil from the heat treated and dehulled oil seeds to provide the canola oil seed meal.

The canola oil seed meal produced by the process then may be processed to recover canola protein isolates therefrom having a protein content of at least about 90% by weight (N×6.25), preferably at least 100% by weight. The canola protein isolation procedure used preferably is one of those described in the aforementioned US Patent Applications.

GENERAL DESCRIPTION OF INVENTION

The present invention is concerned with the processing of canola oil seeds to produce a canola oil seed meal from which canola protein isolates can be prepared.

The process involves heat treatment of the canola oil seeds to inactivate myrosinase enzymes and other enzymes present in the seeds and dehulling of the seeds. The dehulling may be effected following heat treatment or before heat treatment. The processed seeds then are subjected to an oil removal step to leave a canola oil seed meal.

The heat treatment may conveniently be effected at approximately 90° C. for a minimum of about 5 minutes, preferably about 10 minutes, using steam heating. As mentioned above, other temperatures, times and procedures may be used, such as infra-red, microwave or radio frequency treatment. Following heat treatment, the oil seeds are usually cooled to ambient temperature for further processing.

Figure 1:
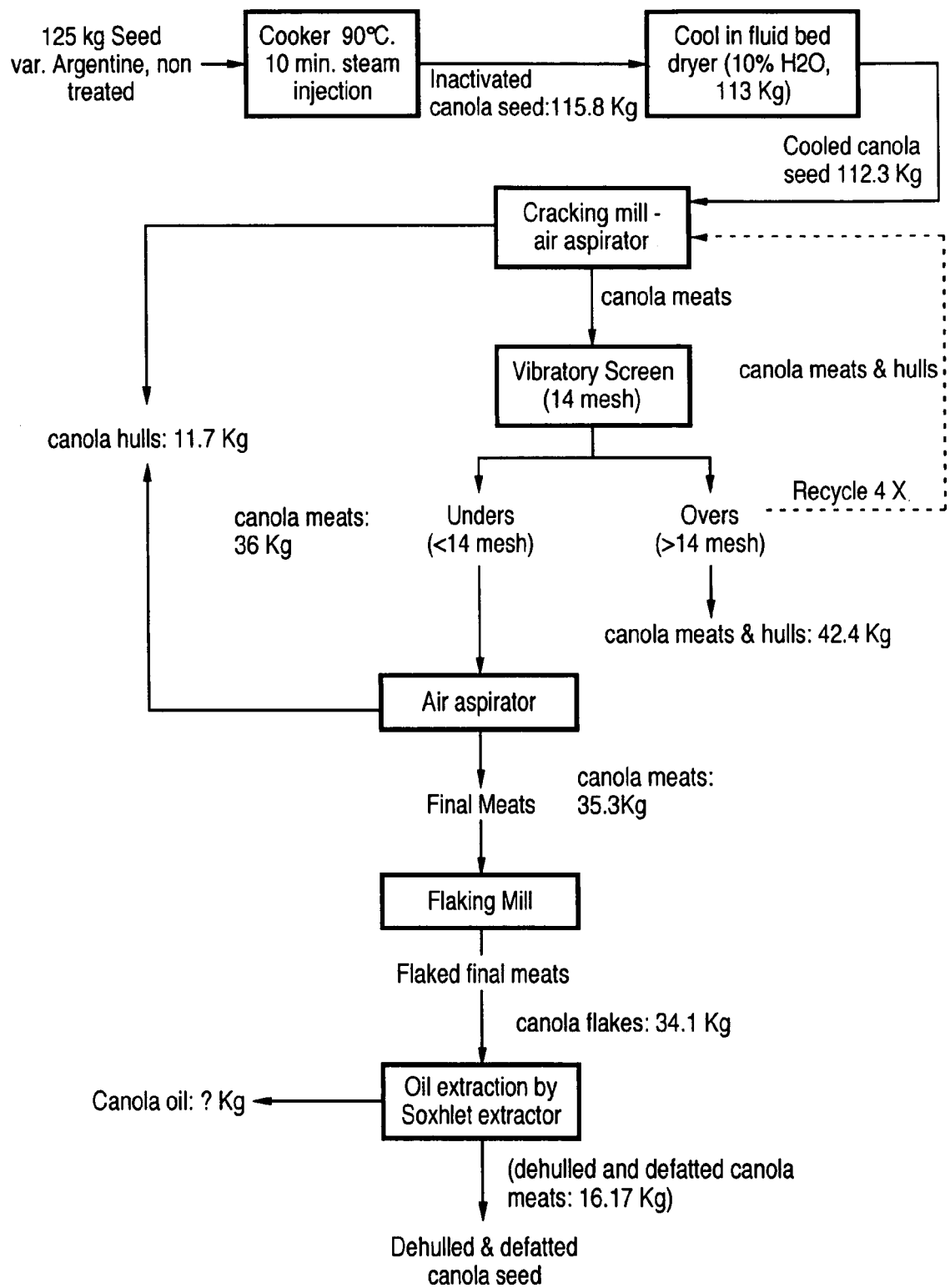
FIG. 1 is a process flow chart of a preparative procedure for obtaining a dehulled and defatted canola oil seed in accordance with one preferred embodiment of the invention.

In one embodiment of the invention, illustrated in FIG. 1, canola oil seeds are first inactivated in a cooker at about 90° C. for about 10 minutes by steam injection. The inactivated oil seeds then are cooled to ambient temperature, such as by employing a fluid bed dryer. The cooled deactivated canola oil seeds then are forwarded to a cracking mill wherein canola hulls are cracked and the cracked hulls are separated from canola meats, such as by air aspiration. The canola meats are separated into a larger (overs) fraction and a smaller (unders) fraction, such as by the use of a vibratory screen. In the illustrated example of FIG. 1, a 14 mesh screen is used for the separation step.

The overs fraction tends to have more residual uncracked hulls associated therewith and generally is recycled to the cracking mill several times to remove residual hulls. Once the overs fraction has been dehulled, it can be processed for the recovery of canola oil and production of canola oil seed meal, by flaking the meat and effecting solvent extraction of the flakes. The recovered meal usually is desolventized.

The unders fraction is processed to remove residual hulls, such as by air aspiration. Once the unders fraction has been dehulled, it can be processed for the recovery of canola oil and production of canola oil seed meal, by flaking the meat and effecting solvent extraction of the flakes. The remaining meal usually is desolventized. The canola meat overs and unders may concurrently be combined prior to the flaking step.

Figure 2:
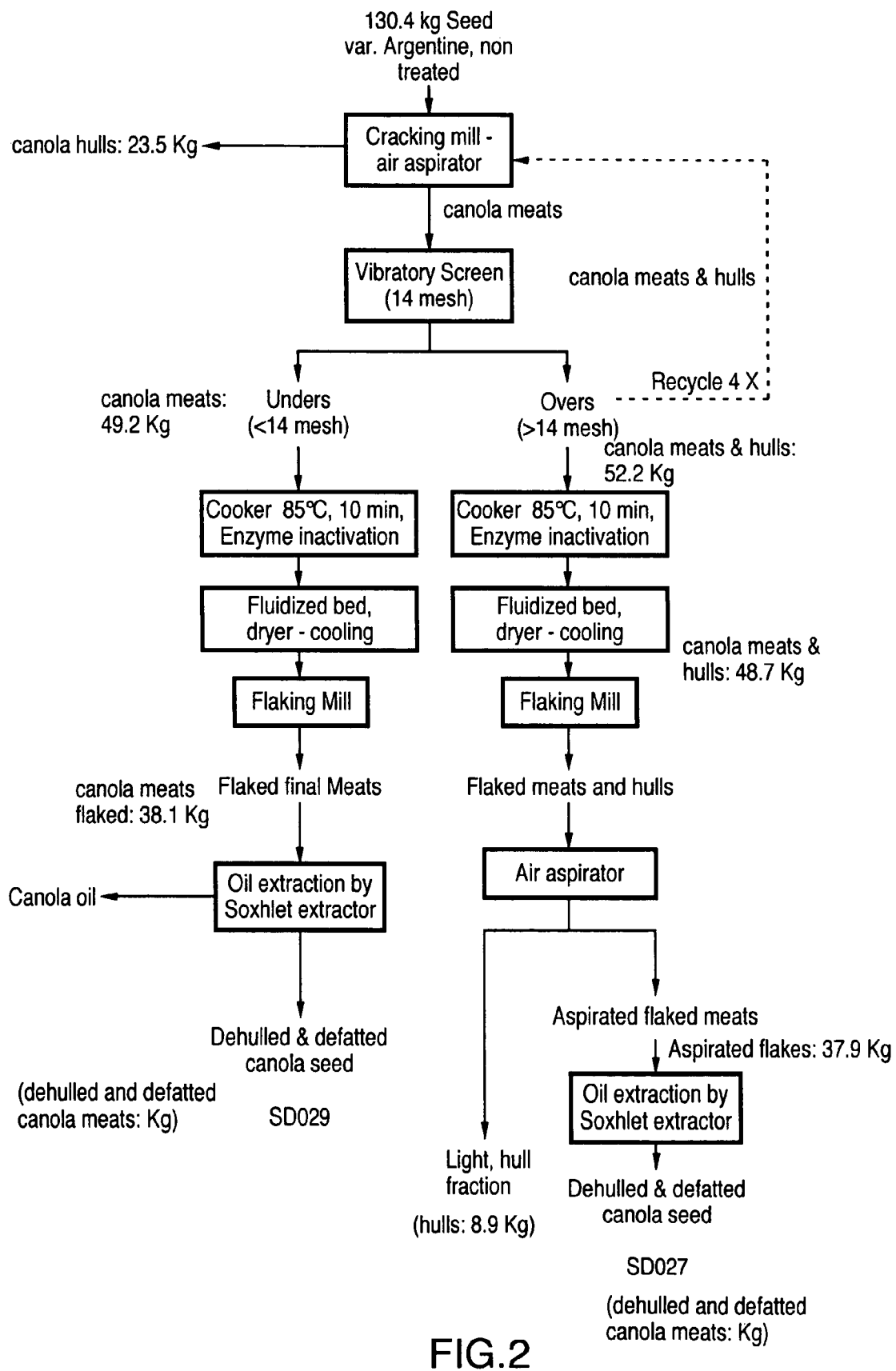
FIG. 2 is a process flow chart of a preparative procedure for obtaining a dehulled and defatted canola oil seed in accordance with a less preferred embodiment of the invention.

In another embodiment of the invention illustrated in FIG. 2, enzyme inactivation is effected after dehulling. The canola oil seed meal is fed to a cracking mill wherein canola hulls are cracked and the cracked hulls are separated from canola meats. The canola meats are separated into a larger (overs) fraction and a smaller (unders) fraction, such as by the use of a vibratory screen. The overs fraction tends to have more residual uncracked hulls associated therewith and generally is recycled to the cracking mill several times to remove residual hulls.

Each of the overs and unders fractions is subjected to inactivation in a cooker at about 90° C. for 10 minutes by steam injection. The inactivated fractions then are separately cooled, such as by utilizing a fluid bed dryer.

The cooled fractions then are processed for the recovery of canola oil and production of canola oil seed meal. The overs fraction is subjected to flaking, residual hull removal, such as by air aspiration, and solvent extraction of the flakes. The remaining meal may be desolventized.

The unders fraction is subjected to flaking and the flakes are subjected to solvent extraction. The residual meal may be desolventized.

The residual meal prepared by these procedures is further processed to recover canola protein isolate therefrom using the procedure described in the aforementioned US patent applications, as described in further detail below.

The respective PMM-derived canola protein isolate and supernatant-derived canola protein isolate may be isolated from canola oil seed meal by either a batch process or a continuous process or a semi-continuous process as generally described in the aforementioned United States patent applications.

The initial step of the process of providing the canola protein isolates involves solubilizing proteinaceous material from canola oil seed meal. The proteinaceous material recovered from canola seed meal may be the protein naturally occurring in canola seed or the proteinaceous material may be a protein modified by genetic manipulation but possessing characteristic hydrophobic and polar properties of the natural protein. The canola meal may be any canola meal resulting from the removal of canola oil from canola oil seed with varying levels of non-denatured protein, resulting, for example, from hot hexane extraction or cold oil extrusion methods. The removal of canola oil from canola oil seed usually is effected as a separate operation from the protein isolate recovery procedure described herein.

Protein solubilization is effected in accordance with the present invention by using a salt solution. The salt usually is sodium chloride, although other suitable salts, such as potassium chloride and calcium chloride, may be used. The salt solution has an ionic strength of at least about 0.10, preferably at least about 0.15, to enable solubilization of significant quantities of protein to be effected. As the ionic strength of the salt solution increases, the degree of solubilization of protein in the oil seed meal initially increases until a maximum value is achieved. Any subsequent increase in ionic strength does not increase the total protein solubilized. The ionic strength of the salt solution which causes maximum protein solubilization varies depending on the oil seed meal chosen.

In view of the greater degree of dilution required for protein precipitation with increasing ionic strengths, it is usually preferred to utilize an ionic strength value less than about 0.8, and more preferably a value of about 0.15 to about 0.6.

In a batch process, the salt solubilization of the protein is effected at a temperature of at least about 5° C. and preferably up to about 35° C., preferably accompanied by agitation to decrease the solubilization time, which is usually about 10 to about 60 minutes. It is preferred to effect the solubilization to extract substantially as much protein from the oil seed meal as is practicable, so as to provide an overall high product yield.

The lower temperature limit of about 5° C. is chosen since solubilization is impractically slow below this temperature while the upper preferred temperature limit of about 35° C. is chosen since the process becomes uneconomic at higher temperature levels in a batch mode.

In a continuous process, the extraction of the protein from the canola oil seed meal is carried out in any manner consistent with effecting a continuous extraction of protein from the canola oil seed meal. In one embodiment, the canola oil seed meal is continuously mixed with a salt solution and the mixture is conveyed through a pipe or conduit having a length and at a flow rate for a residence time sufficient to effect the desired extraction in accordance with the parameters described herein. In such continuous procedure, the salt solubilization step is effected rapidly, in a time of up to about 10 minutes, preferably to effect solubilization to extract substantially as much protein from the canola oil seed meal as is practicable. The solubilization in the continuous procedure preferably is effect at elevated temperatures, preferably above about 35° C., generally up to about 65° C.

The aqueous salt solution and the canola oil seed meal have a natural pH of about 5 to about 6.8 to enable a protein isolate to be formed by the micellar route, as described in more detail below.

At and close to the limits of the pH range, protein isolate formation occurs only partly through the micelle route and in lower yields than attainable elsewhere in the pH range. For these reasons, pH values of about 5.3 to about 6.2 are preferred.

The pH of the salt solution may be adjusted to any desired value within the range of about 5 to about 6.8 for use in the extraction step by the use of any convenient acid, usually hydrochloric acid, or alkali, usually sodium hydroxide, as required.

The concentration of oil seed meal in the salt solution during the solubilization step may vary widely. Typical concentration values are about 5 to about 15% w/v.

The protein extraction step with the aqueous salt solution has the additional effect of solubilizing fats which may be present in the canola meal, which then results in the fats being present in the aqueous phase.

The protein solution resulting from the extraction step generally has a protein concentration of about 5 to about 40 g/L, preferably about 10 to about 30 g/L.

The aqueous phase resulting from the extraction step then may be separated from the residual canola meal, in any convenient manner, such as by employing a decanter centrifuge, followed by disc centrifugation and/or filtration to remove residual meal. The separated residual meal may be dried for disposal.

The colour of the final canola protein isolate can be improved in terms of light colour and less intense yellow by the mixing of powdered activated carbon or other pigment adsorbing agent with the separated aqueous protein solution and subsequently removing the adsorbent, conveniently by filtration, to provide a protein solution. Diafiltration also may be used for pigment removal.

Such pigment removal step may be carried out under any convenient conditions, generally at the ambient temperature of the separated aqueous protein solution, employing any suitable pigment adsorbing agent. For powdered activated carbon, an amount of about 0.025% to about 5% w/v, preferably about 0.05% to about 2% w/v, is employed.

Where the canola seed meal contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution and on the concentrated aqueous protein solution discussed below. When the colour improvement step is carried out, such step may be effected after the first defatting step.

An alternative procedure is to extract the oil seed meal with the salt solution at a relatively high pH value above about 6.8, generally up to about 9.9. The pH of the sodium chloride solution, may be adjusted in pH to the desired alkaline value by the use of any convenient food-grade alkali, such as aqueous sodium hydroxide solution. Alternatively, the oil seed meal may be extracted with the sodium solution at a relatively low pH below about pH 5, generally down to about pH 3.

Where such alternative is employed, the aqueous phase resulting from the oil seed meal extraction step then is separated from the residual canola meal, in any convenient manner, such as by employing decanter centrifugation, followed by disc centrifugation to remove residual meal. The separated residual meal may be dried for disposal.

The aqueous protein solution resulting from the high or low pH extraction step then is pH adjusted to the range of about 5 to about 6.8, preferably about 5.3 to about 6.2, as discussed above, prior to further processing as discussed below. Such pH adjustment may be effected using any convenient acid, such as hydrochloric acid, or alkali, such as sodium hydroxide, as appropriate.

The aqueous protein solution then is concentrated to increase the protein concentration thereof while maintaining the ionic strength thereof substantially constant. Such concentration generally is effected to provide a concentrated protein solution having a protein concentration of at least about 50 g/L, preferably at least about 200 g/L, more preferably at least about 250 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 100,000 daltons, preferably about 5,000 to about 10,000 daltons, having regard to differing membrane materials and configurations, and, for continuous operation, dimensioned to permit the desired degree of concentration as the aqueous protein solution passes through the membranes.

The concentrated protein solution then may be subjected to a diafiltration step using an aqueous sodium chloride solution of the same molarity and pH as the extraction solution. Such diafiltration may be effected using from about 2 to about 20 volumes of diafiltration solution, preferably about 5 to about 10 volumes of diafiltration solution. In the diafiltration operation, further quantities of contamination are removed from the aqueous protein solution by passage through the membrane with the permeate. The diafiltration operation may be effected until no significant further quantities of phenolics and visible colour are present in the permeate. Such diafiltration may be effected using a membrane having a molecular weight cut-off in the range of about 3,000 to about 100,000 daltons, preferably about 5,000 to about 10,000 daltons, having regard to different membrane materials and configuration.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit oxidation of phenolics present in the concentrated canola protein isolate solution.

The concentration step and the diafiltration step may be effected at any convenient temperature, generally about 20° to about 60° C., preferably about 20 to about 30° C., and for the period of time to effect the desired degree of concentration. The temperature and other conditions used to some degree depend upon the membrane equipment used to effect the concentration and the desired protein concentration of the solution.

The concentrating of the protein solution to the preferred concentration above about 200 g/L in this step not only increases the process yield to levels above about 40% in terms of the proportion of extracted protein which is recovered as dried protein isolate, preferably above about 80%, but also decreases the salt concentration of the final protein isolate after drying. The ability to control the salt concentration of the isolate is important in applications of the isolate where variations in salt concentrations affect the functional and sensory properties in a specific food application.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as, carbohydrates, pigments and anti-nutritional factors, as well as any low molecular weight forms of the protein. The molecular weight cut-off of the membrane is usually chosen to ensure retention of a significant proportion of the protein in the solution, while permitting contaminants to pass through having regard to the different membrane materials and configurations.

The concentrated and optionally diafiltered protein solution may be subject to a further defatting operation, if required, as described in U.S. Pat. Nos. 5,844,086 and 6,005,076.

The concentrated and optionally diafiltered protein solution may be subject to a colour removal operation as an alternative to the colour removal operation described above. Powdered activated carbon may be used herein as well as granulated activated carbon (GAC). Another material which may be used as a colour adsorbing agent is polyvinyl pyrrolidone.

The colour absorbing agent treatment step may be carried out under any convenient conditions, generally at the ambient temperature of the canola protein solution. For powdered activated carbon, an amount of about 0.025% to about 5% w/v, preferably about 0.05% to about 2% w/v, may be used. Where polyvinylpyrrolidone is used as the colour adsorbing agent, an amount of about 0.5% to about 5% w/v, preferably about 2% to about 3% w/v, may be used. The colour adsorbing agent may be removed from the canola protein solution by any convenient means, such as by filtration.

The concentrated and optionally diafiltered protein solution resulting from the optional colour removal step may be subjected to pasteurization to kill any bacteria which may have been present in the original meal as a result of storage or otherwise and extracted from the meal into the canola protein isolate solution in the extraction step. Such pasteurization may be effected under any desired pasteurization conditions. Generally, the concentrated and optionally diafiltered protein solution is heated to a temperature of about 55° to about 70° C., preferably about 60° to about 65° C., for about 10 to about 15 minutes, preferably about 10 minutes. The pasteurized concentrated protein solution then may be cooled for further processing as described below, preferably to a temperature of about 25° to about 40° C.

Depending on the temperature employed in the concentration step, the concentrated protein solution may be warmed to a temperature of at least about 20°, and up to about 60° C., preferably about 25° to about 40° C., to decrease the viscosity of the concentrated protein solution to facilitate performance of the subsequent dilution step and micelle formation. The concentrated protein solution should not be heated beyond a temperature above which the temperature of the concentrated protein solution does not permit micelle formation on dilution by chilled water. The concentrated protein solution may be subject to a further defatting operation, if required, as described in the aforementioned U.S. Pat. Nos. 5,844,086 and 6,005,076.

The concentrated protein solution resulting from the concentration step, and optional diafiltration step, optional colour removal step, optional pasteurization step and optional defatting step, then is diluted to effect micelle formation by mixing the concentrated protein solution with chilled water having the volume required to achieve the degree of dilution desired. Depending on the proportion of canola protein desired to be obtained by the micelle route and the proportion from the supernatant, the degree of dilution of the concentrated protein solution may be varied. With higher dilution levels, in general, a greater proportion of the canola protein remains in the aqueous phase.

When it is desired to provide the greatest proportion of the protein by the micelle route, the concentrated protein solution is diluted by about 15 fold or less, preferably about 10 fold or less.

The chilled water with which the concentrated protein solution is mixed has a temperature of less than about 15° C., generally about 3° to about 15° C., preferably less than about 10° C., since improved yields of protein isolate in the form of protein micellar mass are attained with these colder temperatures at the dilution factors used.

In a batch operation, the batch of concentrated protein solution is added to a static body of chilled water having the desired volume, as discussed above. The dilution of the concentrated protein solution and consequential decrease in ionic strength causes the formation of a cloud-like mass of highly associated protein molecules in the form of discrete protein droplets in micellar form. In the batch procedure, the protein micelles are allowed to settle in the body of chilled water to form an aggregated, coalesced, dense, amorphous sticky gluten-like protein micellar mass (PMM). The settling may be assisted, such as by centrifugation. Such induced settling decreases the liquid content of the protein micellar mass, thereby decreasing the moisture content generally from about 70% by weight to about 95% by weight to a value of generally about 50% by weight to about 80% by weight of the total micellar mass. Decreasing the moisture content of the micellar mass in this way also decreases the occluded salt content of the micellar mass, and hence the salt content of dried isolate.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution of the concentrated protein solution.

The mixing of the concentrated protein solution and the diluting water in the pipe initiates the formation of protein micelles and the mixture is continuously fed from the outlet from the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein micelles are allowed to settle in the settling vessel to form an aggregated, coalesced, dense, amorphous, sticky, gluten-like protein micellar mass (PMM) and the procedure is continued until a desired quantity of the PMM has accumulated in the bottom of the settling vessel, whereupon the accumulated PMM is removed from the settling vessel. In the batch process, the settling may be assisted, such as by centrifugation.

The combination of process parameters of concentrating of the protein solution to a preferred protein content of at least about 200 g/L and the use of a dilution factor less than about 15, result in higher yields, often significantly higher yields, in terms of recovery of protein in the form of protein micellar mass from the original meal extract, and much purer isolates in terms of protein content than achieved using any of the known prior art protein isolate forming procedures discussed in the aforementioned U.S. patents.

By the utilization of a continuous process for the recovery of canola protein isolate as compared to the batch process, the initial protein extraction step can be significantly reduced in time for the same level of protein extraction and significantly higher temperatures can be employed in the extraction step. In addition, in a continuous operation, there is less chance of contamination than in a batch procedure, leading to higher product quality and the process can be carried out in more compact equipment.

The settled isolate is separated from the residual aqueous phase or supernatant, such as by decantation of the residual aqueous phase from the settled mass or by centrifugation. The PMM may be used in the wet form or may be dried, by any convenient technique, such as spray drying, freeze drying or vacuum drum drying, to a dry form. The dry PMM has a high protein content, in excess of about 90 wt % protein, preferably at least about 100 wt % protein (calculated as Kjeldahl N×6.25), and is substantially undenatured (as determined by differential scanning calorimetry). The dry PMM isolated from fatty oil seed meal also has a low residual fat content, when the procedures of U.S. Pat. Nos. 5,844,086 and 6,005,076 are employed as necessary, which may be below about 1 wt %. The canola protein isolate contains decreased quantities of phytic acid, when compared to extraction of meal with aqueous sodium chloride solution under the same reaction conditions, and which preferably may be below about 1 wt %.

The supernatant from the PMM formation and settling step contains significant amounts of canola protein, not precipitated in the dilution step, and is processed to recover canola protein isolate therefrom. The supernatant from the dilution step, following removal of the PMM, is concentrated to increase the protein concentration thereof. Such concentration is effected using any convenient selective membrane technique, such as ultrafiltration, using membranes with a suitable molecular weight cut-off permitting low molecular weight species, including the salt and other non-proteinaceous low molecular weight materials extracted from the protein source material, to pass through the membrane, while retaining canola protein in the solution. Ultrafiltration membranes having a molecular weight cut-off of about 3,000 to 100,000 daltons, having regard to differing membrane materials and configuration, may be used. Concentration of the supernatant in this way also reduces the volume of liquid required to be dried to recover the protein. The supernatant generally is concentrated to a protein concentration of about 100 to about 400 g/L, preferably about 200 to about 300 g/L, prior to drying. Such concentration operation may be carried out in a batch mode or in a continuous operation, as described above for the protein solution concentration step.

The concentrated supernatant may be dried by any convenient technique, such as spray drying, freeze drying or vacuum drum drying, to a dry form to provide a further canola protein isolate. Such further canola protein isolate has a high protein content, in excess of about 90 wt %, preferably at least about 100 wt % protein (calculated as Kjeldahl N×6.25) and is substantially undenatured (as determined by differential scanning calorimetry).

If desired, at least a portion of the wet PMM may be combined with at least a portion of the concentrated supernatant prior to drying the combined protein streams by any convenient technique to provide a combined canola protein isolate composition according to one invention. The relative proportions of the proteinaceous materials mixed together may be chosen to provide a resulting canola protein isolate composition having a desired profile of 2S/7S/12S proteins. Alternatively, the dried protein isolates may be combined in any desired proportions to provide any desired specific 2S/7S/12S protein profiles in the mixture and thereby provide a composition according to the invention. The combined canola protein isolate composition has a high protein content, in excess of about 90 wt %, preferably at least about 100 wt %, (calculated as Kjeldahl N×6.25) and is substantially undenatured (as determined by differential scanning calorimetry).

In another alternative procedure, where a portion only of the concentrated supernatant is mixed with a part only of the PMM and the resulting mixture dried, the remainder of the concentrated supernatant may be dried as may any of the remainder of the PMM. Further, dried PMM and dried supernatant also may be dry mixed in any desired relative proportions, as discussed above.

By operating in this manner, a number of canola protein isolates may be recovered, in the form of dried PMM, dried supernatant and dried mixtures of various proportions by weight of PMM-derived canola protein isolate and supernatant-derived canola protein isolate, generally from about 5:95 to about 95:5 by weight, which may be desirable for attaining differing functional and nutritional properties based on the differing proportions of 2S/7S/12S proteins in the compositions.

As an alternative to dilution of the concentrated protein solution into chilled water and processing of the resulting precipitate and supernatant as described above, protein may be recovered from the concentrated protein solution by dialyzing the concentrated protein solution to reduce the salt content thereof. The reduction of the salt content of the concentrated protein solution results in the formation of protein micelles in the dialysis tubing. Following dialysis, the protein micelles may be permitted to settle, collected and dried, as discussed above. The supernatant from the protein micelle settling step may be processed, as discussed above, to recover further protein therefrom. Alternatively, the contents of the dialysis tubing may be directly dried. The latter alternative procedure is useful where small laboratory scale quantities of protein are desired.

EXAMPLES

Example 1

This Example describes the preparation of canola oil seed meal and the subsequent processing to obtain a canola protein isolate.

125 kg of canola seed of the variety Argentina was processed according to the process depicted in FIG. 1. The seed was first submitted to heat treatment in a cooker heated by steam at 90° C. for a 10 minute hold time in order to deactivate myrosinase and other enzymes. After cooling the resulting 115.8 kg of inactivated canola oil in a fluid bed dryer, the seeds were cracked and the hulls were partially removed by air aspiration.

The larger canola meats (overs) were separated with a 14-mesh vibratory screen and the overs were recycled 4 times to the cracking mill to provide 42.4 kg of mainly canola meats and a smaller fraction of hulls. The unders (36 kg) were passed through final air aspiration for removal of residual hulls. The final meats (35.3 kg) or the unders fraction, were flaked by a flaking mill before passage of 34.1 kg of canola flakes to a Soxhlet extractor for oil extraction by solvent while the overs fraction was discarded.

The dehulled and defatted meal from the oil extraction (16.17 kg) was used as the starting material for protein extraction, as described in Example 2 below. The dehulled canola meal was identified as SD024.

Two additional fractions of dehulled and defatted canola meal were obtained from a second 130.4 kg batch of canola seed of the variety Argentina following the procedure of FIG. 2. For this batch, the seeds were initially cracked and the hulls partially removed by air aspiration.

The larger canola meats were separated with a 14-mesh vibratory screen and the overs were recycled 4 times to provide 52.2 kg of canola meats and hulls. After the last pass through the vibratory screen, both unders (49.2 kg) and overs were heat-treated using steam at 90° C. for 10 minutes. The fractions were cooled down in a fluidized bed dryer. The final meats were flaked in a flaking mill. The flakes obtained from the unders (38.1 kg) were solvent extracted directly using a Soxhlet extractor to remove the oil, producing (11.35 kg) a defatted meal identified as SD029. The flakes obtained from the overs were air aspirated another time and the aspirated flakes solvent extracted using a Soxhlet extractor to remove the oil, producing a defatted meal (11.37 kg) identified as SD027.

Figure 4:
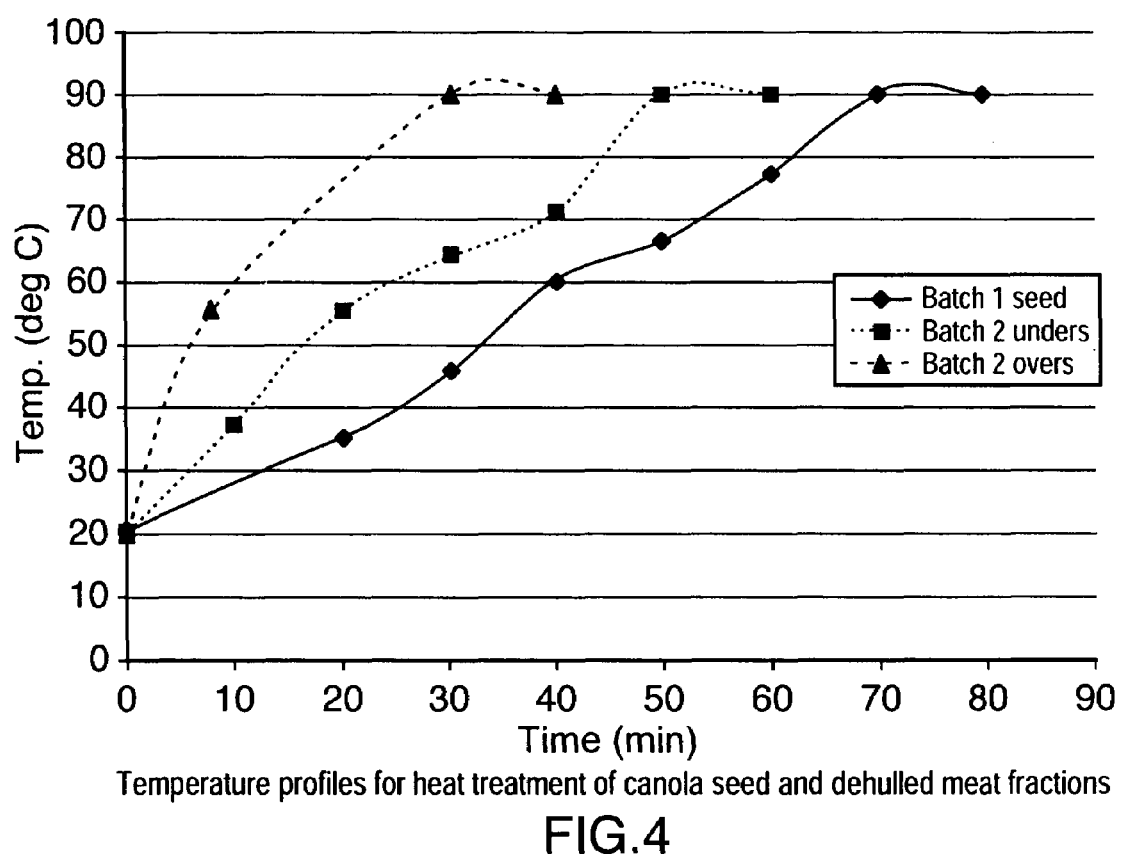
FIG. 4 is a graphical representative of temperature profiles for heat treatment of canola oil seed and dehulled meat fractions.

The temperature profiles during inactivation of the canola oil seed for samples SD024 ("Batch #1"), SD029 ("Batch #2 unders") and SD027 ("Batch #2 overs") are shown in FIG. 4.

In the procedure, a total of 35.3 kg of dehulled meats (unders) was recovered from 112.3 kg of inactivated canola seed in batch #1 to produce a total yield of 31.43 wt %. A total of 38.1 kg of dehulled and flaked fines (unders) were produced from 130.4 kg of batch #2 canola, resulting in a yield of 29.2 wt %. The relatively low yields of dehulled canola can partly be attributed to ineffective cracking of the smaller canola seeds due to the use of coarse rollers in the cracking mill. The use of finer pitch rolls (18 corrugations per inch) will permit a narrower gap between the rolls and enable cracking of smaller seeds. A larger and more uniform seed may also increase the yield and consistency of dehulling.

Aspiration conditions were adjusted in order to achieve effective separation of hulls from the meats. The differential air pressure setting of 0.4 to 0.8 inches of water resulted in an effective separation. Larger pressure differentials caused excessive endosperm to be removed with the hull fraction.

The meat fraction recovered from air aspiration consisted of a wide range of particle size and the canola that was more finely cracked contained a smaller proportion of hull fragments. As a result, the smaller dehulled meats fraction could be recovered from the larger meats and hulls by screening through the 14 mesh vibratory screen. The optimum screen size was pre-selected by hand screening tests prior to set-up of the equipment.

Flaking was carried out to rupture the oil cells by passing the dehulled endosperm fractions through a set of smooth rollers on a Lauhauf flaking mill.

The dehulled meat from both batches #1 and #2 were effectively flaked using a gap setting of 0.08 mm and produced a flake thickness ranging from 0.101 to 0.125 mm. Flakes produced from the batch #2 process, however, were fragile and crumbled somewhat in comparison to the batch #1 flakes. This result indicated that inactivating the canola seed prior to dehulling produced a more stable flake.

Following defatting, residual oil content of the batch #1 defatted canola meal was 1.50 wt %. Batch #2 meal contained 1.87 wt % and 1.23 wt % oil in the unders and overs fraction, respectively.

Example 2

This Example illustrates the preparation of canola protein isolates from the defatted meals prepared according to the procedures of Example 1.

Figure 3:
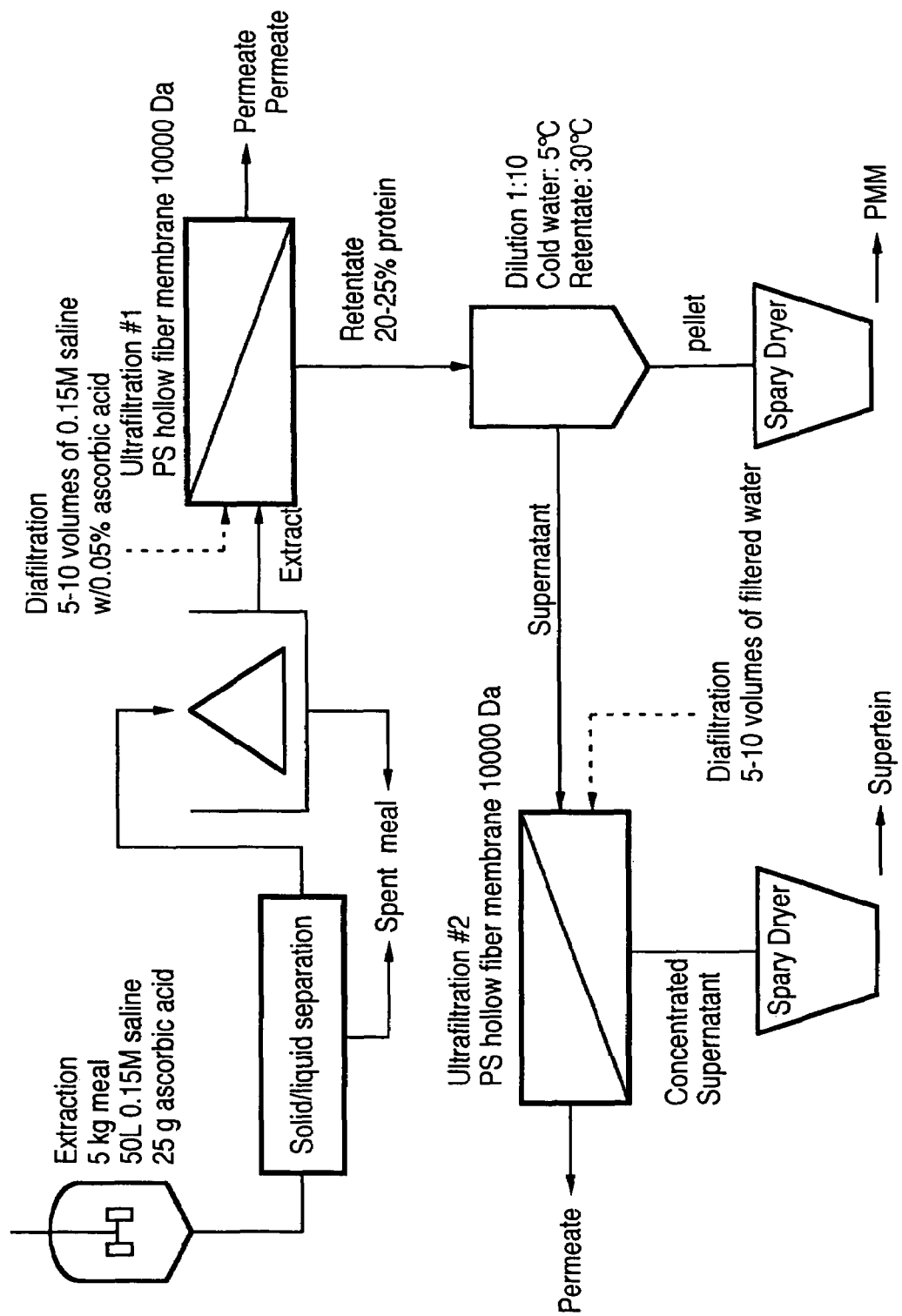
FIG. 3 is a flow chart for the preparation of a canola protein isolate from the dehulled and defatted canola oil seed prepared according to the procedure of FIG. 1 or FIG. 2.

Dehulled, defatted and myrosinase-inactivated canola meals, prepared as described in Example 1, were processed according to the procedure of FIG. 3, to produce canola protein isolates.

'a' kg of dehulled, defatted and myrosinase inactivated canola meal was added to 'b' L of 0.15 M NaCl solution at ambient temperature and agitated for 30 minutes to provide an aqueous protein solution. The residual canola meal was removed by filtration through cheese cloth or by other suitable filtration methods. The resulting protein solution was clarified by centrifugation to produce 'c' L of a clarified protein solution having a protein content of 'd' g/L.

A 'e' L aliquot of the protein extract solution was reduced in volume to 'f' L by concentration on an ultrafiltration system using 'g' dalton molecular weight cutoff membrane. The resulting concentrated protein solution had a protein content of 'h' g/L. The concentrated protein solution was then diafiltered using 'i' dalton molecular cut-off membranes using 'j' L of 0.15 M sodium chloride solution containing 0.05 wt % ascorbic acid to a final volume of 'k' L of diafiltered protein solution with a protein content of 'l' g/L.

The diafiltered protein solution at 'm'° C. was diluted 'n' into 'o'° C. water. A white cloud formed immediately and was allowed to settle. The upper diluting water was removed and the precipitated, viscous, sticky mass (PMM) was recovered from the bottom of the vessel in a yield of 'p' wt % of the extracted protein. The dried PMM derived protein was found to have a protein content of 'q' % (N×6.25) d.b. The product was given designation 'r'.

The parameters 'a' to 'r' are given in the following Table I:

TABLE I

| r | BW-SD024-B03-03A C300 | BW-SD029-B10-03A C300 | BW-SD027-B17-02A C300 |
|---|---|---|---|
| a | 5 | 5 | 5 |
| b | 50 | 50 | 50 |
| c | 38.3 | 39 | 36 |
| d | 25.7 | 21.6 | 23.1 |
| e | 38.3 | 39 | 36 |
| f | 2.5 | 3.5 | 2.5 |
| g | 10000 | 10000 | 10000 |
| h | 218.3 | 218.9 | 232.0 |
| i | 10000 | 10000 | 10000 |
| j | 50 | 35 | 17.5 |
| k | 1.8 | 3.5 | 2.5 |
| l | 266.7 | 218.9 | 232.0 |
| m | 30.5 | 31 | 31.4 |
| n | 1:10 | 1:10 | 1:10 |
| o | 1.7 | 2 | 2.2 |
| p | 40.2 | 55.6 | 57.3 |
| q | 106.7 | 110.1 | 107.6 |

The removed diluting water was reduced in volume by ultrafiltration using a 's' dalton molecular weight cut-off membrane to a protein concentration of 't' g/L. The concentrate was dried. With the additional protein recovered from the supernatant, the overall protein recovery was 'u' wt % of the extracted protein. The dried protein formed had a protein content of 'v' wt % (N×6.25) d.b.

The product was given designation 'w'. The parameters s to w are given in the following Table II:

TABLE II

|  | BW-SD024-B03-03A C200 | BW-SD029-B10-03A C200 | BW-SD027-B17-02A C200 |
|---|---|---|---|
| s | 10000 | 10000 | 10000 |
| t | 20.7 | 52.1 | 118.0 |
| u | 46.7 | 70.6 | 78.6 |
| v | 103.8 | 103.6 | 106.2 |

Example 3

This Example describes the results obtained by following the procedures of Example 2.

(a) Extraction and Separation Steps:

Table III below represents the apparent extractabilities for the three different meals. The apparent extractability represents the percentage of protein that could be recovered if the total saline volume could be recovered. However, the recovery can vary due to differences in the meal and/or to different liquid hold-up in the meal. When the actual volume post clarification processes is taken into account for calculations, then the result is protein yield. The apparent extractability is higher than 40% for all three cases. For SD024 and SD027 meal, they are in the same order of magnitude with 47.5 wt % and 46.1 wt %, respectively. The number for the SD029 meal is slightly smaller. The apparent extractability is not significantly influenced by the dehulling and heat treatment process of the meal, as the extractability numbers are in the same range as for low temperature desolventized or marc meal (data not shown).

TABLE III

Apparent extractabilities and protein yields in the post filtration liquids

|  | Apparent extractability (wt %) | Protein yield post filtration step (wt %) |
|---|---|---|
| BW-SD024-B03-03A | 47.5% | 36.4% |
| BW-SD029-B10-03A | 41.3% | 38.0% |
| BW-SD027-B17-03A | 46.1% | 33.1% |

(b) Ultrafiltration #1 and #2:

The protein recovery (Table IV) for SD029 and SD027 meal is similar to the values usually observed for other meals for ultrafiltration #1 when using PVDF 5 spiral membranes. The lower value of 55 wt % for SD024 meal is due to some protein losses in the permeates. A chromatogram of the permeate showed a significant amount of 2S protein for the batch BW-SD024-B03-03A. This loss of protein is thought be due to the newness of the membrane employed.

TABLE IV

Protein recoveries and protein yields in retentate for ultrafiltration #1

|  | Protein recovery in retentate (wt %) | Protein yield post ultrafiltration (wt %) |
|---|---|---|
| BW-SD024-B03-03A | 55% | 17.78% |
| BW-SD029-B10-03A | 72% | 27.38% |
| BW-SD027-B17-03A | 70% | 23.15% |

For the Ultrafiltration #2, the protein recovery was 75 wt % (SD024), 90 wt % (SD029) and 100 wt % (SD027).

(c) Protein Distribution in Final Products:

Tables V and VI below represent the protein distribution for the finished PMM-derived isolates and supernatant-derived isolates. The protein peaks from the SEC chromatograms were considered as one group being 100 wt %. That means, for example, if there is 80 wt % 7S, then 80 wt % of the total peak area of all the protein peaks belongs to 7S protein.

TABLE V

Protein distribution for PMM derived protein isolates obtained from different meals

|  | 12S (wt) | 7S (wt) | 2S (wt) |
|---|---|---|---|
| BW-SD024-B03-03A | 17.5% | 81.3% | 1.5% |
| BW-SD029-B10-03A | 9.6% | 81.3% | 9.1% |
| BW-SD027-B17-03A | 7.9% | 82.4% | 9.7% |

As may be seen the protein distribution in the PMM follows the same pattern that has been observed previously (see copending U.S. patent application Ser. No. 10/413,371 filed Apr. 15, 2003 (WO 03/088760), assigned to the assignee hereof and the disclosure of which is incorporated herein by reference) that 7S is the major protein in PMM. A reduced 2S amount and therefore a higher 12S concentration was found for the PMM obtained from SD024 meal which is due to the protein loss through the membrane.

TABLE VI

Protein distribution of Supernatant-derived protein isolates obtained from different meals

|  | 12S (wt) | 7S (wt) | 2S (wt) |
|---|---|---|---|
| BW-SD024-B03-03A | 6.8% | 81.7% | 11.5% |
| BW-SD029-B10-03A | 1.5% | 16.7% | 82.9% |
| BW-SD027-B17-03A | 0.7% | 9.6% | 89.7% |

As a result of the 2S loss for the SD024 meal, the product yield as wt % of extracted protein was significantly less than for SD027 or SD029 meal. The composition of the supernatant-derived isolate resembles that of the PMM-derived isolate. For the dilution, there is an insufficient amount of 2S protein remaining in solution in the supernatant and, therefore, 2S is not the major protein component. As 7S is also found in supernatant, but at a lower concentration, the absence of 2S has led to 7S being the major protein in supernatant-derived isolate. However, for the later runs with SD029 and SD027 meal, the composition of the supernatant-derived isolate composition is found to be within the normal range that has been previously observed for supernatant-derived isolates.

The above results indicate that, generally, the dehulling and heat treatment process of the meals does not affect the protein composition of the canola protein isolates obtained.

(d) Canola Protein Isolate Colour:

Table VII and Table VIII below represent the "L", "a", "b" colour values for either the dry product or for reconstituted product, in which dry powder was re-suspended in 0.1 M saline and stirred for about an hour, as measured using a Minolta CR-310 colourimeter for the dry product or a Hunter Lab DP-9000 colourimeter for reconstituted. The "L" value, with a range from 0 to 100, represents the lightness of the product (L=100 being white). The "a" value (from −60 to +60) represents the green-red colour space. The more negative the "a" value the greener the product, the more the "a" value tends towards +60 the more red the product. The "b"

value (from −60 to +60) represents the blue-yellow colour space. The more negative the "b" value the bluer the product, the more the "b" value tends towards +60, the more yellow the product.

Comparing the lightness of the dry as well as the reconstituted products, the products obtained from the meal batch which has been heat treated in the seed has the highest L values. These products are significantly lighter than the ones obtained from meal batch #2 for which the heat treatment occurred only after the cracking of the seeds. This result indicates that myrosinase was active and had enough time to catalyze the degradation of glucosinolates before it was finally inactivated. The degradation products of the glucosinolates are considered to contribute to the darker colour of the PMM-derived isolate and supernatant-derived isolate from this meal.

The protein isolates obtained from the SD024 meal tends more towards green whereas the "a" value for isolates from SD027 and SD029 have higher numbers and have a more reddish colour. The dry powders and liquid samples do not show the same trend for the blue-yellow colour space. For example, the "b" value for the dry product for SD024 PMM-derived isolate is the smallest of the three different runs, whereas the SD024 PMM-derived isolate results in the highest "b" value for the liquid sample. The most yellow powder was observed for the SD027 meal in both the PMM-derived isolate and the supernatant-derived isolate. The least yellow product is obtained from SD024 meal for PMM-derived isolate and for SD029 meal for supernatant-derived isolate.

When looking at the liquid colour analysis, the most yellow of PMM-derived isolates is the one resulting from SD024 meal, for supernatant-derived isolate, the most yellow is obtained form SD027.

TABLE VII

L, a, b colour values in the dry powdered products

| | PMM Isolate | | | Supernatant Isolate | | |
|---|---|---|---|---|---|---|
| | L | a | b | L | a | b |
| BW-SD024-B03-03A | 85.36 | −1.57 | +21.34 | 87.06 | −1.40 | +18.24 |
| BW-SD029-B10-03A | 74.76 | +0.15 | +24.69 | 83.02 | −0.61 | +15.94 |
| BW-SD027-B17-03A | 79.07 | +0.25 | +27.26 | 83.58 | −0.44 | +21.18 |

TABLE VIII

L, a, b colour values in the liquid of reconstituted products

| | PMM Isolate | | | Supernatant Isolate | | |
|---|---|---|---|---|---|---|
| | L | a | b | L | a | b |
| BW-SD024-B03-03A | 51.18 | −0.47 | +21.49 | 47.30 | +0.32 | +16.08 |
| BW-SD029-B10-03A | 30.67 | +0.34 | +13.22 | 21.84 | +7.90 | +13.47 |
| BW-SD027-B17-03A | 27.92 | +5.38 | +14.72 | 25.99 | +11.20 | +16.75 |

Example 4

This Example describes the enzyme inactivation employing radio frequency treatment.

A batch of canola seed having a moisture content of about 9% seed was split into three 2 kg samples. One of the samples served as control and was not treated further.

Two 2 kg samples of canola seed of were exposed to radio frequency treatment. The exposure to radio frequency results in a rapid increase of temperature over the whole volume of the canola seed sample. One sample was heated within about 160 seconds from ambient temperature to 90° C. and hold at 90° C. for 5 minutes. The second sample was heated from ambient temperature to 90° C. within about 160 seconds and was then hold at 90° C. for 10 minutes.

After the holding at 90° C., both samples were cooled down to 30° C. by being spread out on a baking pan and stored in a cooling room at 4° C. for about 10 minutes.

Myrosinase activity was tested by testing for glucose, a breakdown product of the glucosinolate degradation. The test procedure is as follows: an 100 g aliquot of canola seed is homogenized in 250 ml tap water with a Silverson homogenizer at 6000 rpm until the mixture forms a paste. This mixture is allowed to sit for 20 minutes and is then centrifuged at 10000×g for 5 minutes. The supernatant from this step is decanted and tested for glucose employing Diastix glucose monitoring strips (Bayer).

All three seed samples, heat treated and control, were tested for glucose. The results are presented in Table IX below.

TABLE IX

| | Glucose Level in Supernatant |
|---|---|
| Control | 6 mmol/l |
| Canola seed heated for 5 minutes at 90° C. | <5 mmol/l |
| Canola seed heated for 10 minutes at 90° C. | Not detected |

There is no glucose detected for the canola seed sample that was heat treated at 90° C. for 10 minutes. This shows that employing radio frequency is an effective means to inactivate myrosinase enzyme.

Example 5

This Example illustrates the preparation of enzyme inactivated canola meal to be used for the production of protein isolates samples in sufficient amount to carry out sensory analysis.

Three tons of canola seed were continuously processed to prepare an enzyme inactivated canola meal. The deactivation of the enzyme was done using a two tray Simon-Rosedown cooker. The cooker was preheated prior to the start of the run. Steam pressures were adjusted while running to maintain the desired seed temperatures. Temperatures in the trays were 60° C. (±5° C.) for the top tray and 82 to 86° C. for the bottom tray. The feed rate of canola seed to the cooker was ~300 kg/hr and the residence time in the bottom tray was ~12 minutes. The deactivated seed was then transferred to a grain dryer and quickly cooled to <60° C.

After deactivation, the canola seed was too dry and required tempering. The seed moisture was 5.74% and was tempered by spraying the seed with 3% water (w/w) to raise the moisture content to ~8.0%. The water and seed were blended for approximately 15 minutes and then transferred into a portabin, covered and allowed to equilibrate for a minimum of 12 hours.

Flaking was done to rupture oil cells and prepare a thin flake with a large surface area for cooking/pre-pressing by passing the seed through a flaking mill. The flake thickness was between 0.18-0.23 mm. The feed rate was controlled to balance the rate of pressing and was approximately 130 kg/hr.

Cooking was done to further rupture oil cells, make flakes pliable and increase the efficiency of the expeller by lowering the viscosity of the oil contained. The cooker was preheated prior to the start of the run. Steam pressures were adjusted while running to maintain the desired flake temperatures. Temperatures in the trays were 42° C. (±2° C.) for the top tray and 65° C. (±3° C.) for the bottom tray.

Pressing removed approximately ⅔ to ¾ of the oil and prepared a material suitable for solvent extraction. The material requires crush resistance to hold up in the extractor and porosity for good mass transfer and drainage. The flaked and cooked seed was pressed using a Simon-Rosedown pre-press. The crude press oil was discarded.

Solvent extraction was the contacting of press cake with iso-hexane to remove the oil from the cake mass. Two mechanisms were in operation: the leaching of the oil into the solvent, and the washing of the marc meal (iso-hexane-solids) with progressively weaker miscelles (hexane-oil). Extraction is normally a continuous counter-current process.

The canola seed press cake was extracted on a Crown Iron Works Loop Extractor (Type II) with iso-hexane using a total residence time of approximately 100 minutes (loop in to loop out) and a solvent to solids ratio of approximately 3.2:1 (w:w). The crude oil was desolventized in a rising film evaporator and steam stripper. The oil was discarded.

Desolventization of the marc (hexane-solids) was done in a steam jacketed Schnecken screw and 2 tray desolventizer-toaster. The temperatures in the trays were <50° C. at Schnecken Exit, 50° C. (±5° C.) for the desolventizer tray and 45° C. (±5° C.) for the toasting tray.

Vacuum drying was done to finish the desolventization of the extracted canola meal. Approximately 150 kg per batch of defatted canola meal was loaded into a Littleford Reactor. The meal was then heated to 47° C. (±2° C.) under a vacuum of 23-25 mmHG. The meal was held at this temperature for 2 hours, then discharged into plastic lined fiber drums. A total of 1317.3 kg of enzyme inactivated, defatted and vacuum desolventized canola meal was produced.

Example 6

This Example illustrates the preparation of canola protein isolates from the defatted, enzyme inactivated meal according to Example 5 and from commercially-available low temperature desolventized meal. The canola protein isolates will be used to compare colour and flavour.

The defatted, enzyme inactivated meal according to Example 5 was given the designation SA034 and the commercial meal was given the designation AL022.

'a' kg of canola meal was added to 'b' L of 0.15 M NaCl solution at ambient temperature, agitated for 30 minutes to provide an aqueous protein solution. The residual canola meal was removed by vacuum filtration (in the case of BW-AL022-B24-03A) or decanter centrifugation (in the case of BW-SA034-E06-04A C300) and disc centrifugation. The resulting protein solution was clarified by filter press filtration to produce 'c' L of a clarified protein solution having a protein content of 'd' g/L.

A 'e' L aliquot of the protein extract solution was reduced in volume to 'f' L by concentration on an ultrafiltration system using 'g' dalton molecular weight cutoff membranes. The resulting concentrated protein solution had a protein content of 'h' g/L. The concentrated protein solution then was diafiltered on a diafiltration system using 'i' Dalton molecular weight cut-off membranes using 'j' L of 'k' M NaCl solution containing 0.05 wt % ascorbic acid to a final volume of 'l' L with a protein content of 'm' g/L.

The concentrated solution at 'n'° C. was diluted 'o' into 'p'° C. water. A white cloud formed immediately and was allowed to settle. The upper diluting water was removed and the precipitated, viscous, sticky mass (PMM) was recovered from the bottom of the vessel in a yield of 'q' wt % of the extracted protein. The dried PMM derived protein was found to have a protein content of 'r' % (N×6.25) d.b. The product was given designation 's'.

|   | BW-AL022-B24-03A C300 | BW-SA034-E06-04A C300 |
|---|---|---|
| a | 150 | 150 |
| b | 1000 | 1500 |
| c | 1180 | 1265 |
| d | 12.2 | 15.7 |
| e | 1180 | 1265 |
| f | 45 | 65 |
| g | 10000 | 5000 |
| h | 283 | 213 |
| i | 10000 | 5000 |
| j | 235 | 325 |
| k | 0.15 | 0.1 |
| l | 35.35 | 57.5 |
| m | 316 | 248 |
| n | 31.9 | 29.6 |
| o | 1:15 | 1:10 |
| p | 3.7 | 3.1 |
| q | 48.7 | 33.6 |
| r | 102.8 | 100.9 |

The removed diluting water was reduced in volume by ultrafiltration using a 't' dalton molecular weight cut-off membrane to a protein concentration of 'u' g/L. The concentrate was dried. With the additional protein recovered from the supernatant, the overall protein recovery was 'v' wt % of the extracted protein. The dried protein formed had a protein content of 'w' wt % (N×6.25) d.b.

The product was given designation 'x'.

| x | BW-AL022-B24-03A C200 | BW-SA034-E06-04A C200 |
|---|---|---|
| t | 10000 | 100000 |
| u | 158.7 | 192.1 |
| v | 78.2 | 56.4 |
| w | 104.4 | 94.7 |

Example 7

This Example describes the results obtained by following the procedure of Example 6.

(a) Sensory Analysis

The canola protein isolate samples were submitted for sensory analysis. The sensory panel consisted of 11 trained panelists. Each panelist was asked which sample has the least amount of flavour and which sample the panelist would prefer.

The canola protein isolates obtained by following the procedure of Example 6 were resuspended in 0.05M saline solution at a concentration of 5% w/v. The protein powders were completely solubilized before sensory tests started.

Table X below shows the results of the sensory analysis for PMM products. It appears that the isolate derived from the enzyme inactivated meal, were found to be the ones with the least amount of flavour and were also the more preferred products. 64% of the panelist found that the PMM of the enzyme inactivated meal had the least amount of flavour whereas 27% found the low temperature meal derived PMM to have the least amount of flavour. 9% of the panelist could not find a difference in between the two products.

When being asked which product they would prefer, 64% of the panelist gave the PMM derived from the enzyme inactivated meal as their preference, 18% preferred the low temperature meal derived product and 18% did not prefer either one of the products.

TABLE X

Sensory analysis of C300 products

|  | Had the least amount of flavour | Preferred Product |
|---|---|---|
| BW-AL022-B24-03A C300 | 3 | 2 |
| BW-SA034-E06-04A C300 | 7 | 7 |
| Could not find a difference | 1 | 2 |

Table XI below shows the results of the sensory analysis for supernatant derived protein isolates. It appears that the isolate derived from the enzyme inactivated meal, were found to be the ones with the least amount of flavour and were also the more preferred products. 55% of the panelist found that the supernatant derived protein of the enzyme inactivated meal had the least amount of flavour whereas 27% found the product obtained from low temperature meal to have the least amount of flavour. 9% of the panelist could not find a difference in between the two products.

When being asked which product they would prefer, 82% of the panelist gave the supernatant derived protein obtained from the enzyme inactivated meal as their preference, 9% preferred the low temperature meal derived product and 9% did not prefer either one of the products.

TABLE XI

Sensory analysis of C200 products

|  | Had the least amount of flavour | Preferred Product |
|---|---|---|
| BW-AL022-B24-03A C200 | 3 | 1 |
| BW-SA034-E06-04A C200 | 6 | 9 |
| Could not find a difference | 2 | 1 |

(a) Colour Analysis

Table XII below shows the "L", "a", "b" colour values for reconstituted product (5% w/v product in 0.05M saline) as measured using a Hunter Lab D9000 colourimeter. The "L" value, with a range from 0 to 100, represents the lightness of the product (L=100 being white). The "a" value (from −60 to +60) represents the green-red colour space. The more negative the "a" value the greener the product, the more the "a" value tends towards +60 the more red the product. The "b" value (from −60 to +60) represents the blue-yellow colour space. The more negative the "b" value the bluer the product, the more the "b" value tend towards +60 the more yellow the product.

Comparing the lightness of the liquid samples it appears that for both protein isolates, PMM and supernatant derived, the L value was significantly higher for the enzyme inactivated meal derived products than for the low temperature meal derived products. That means that the enzyme inactivated meal produced in both cases a much lighter protein isolate.

For the red-green colour space as well as the blue-yellow colour space both the PMM and the supernatant isolate follow the same trend. Using the enzyme inactivated meal as starting material the "a" value is slightly decreased compared to low temperature meal, meaning that the samples tend more towards a greenish colour. The "b" value increases when using enzyme inactivated meal, meaning that the samples appear more yellow compared to samples obtained from low temperature meal.

TABLE XII

L, a, b colour values in the liquid of reconstituted products

|  | PMM Isolate | | | Supernatant Isolate | | |
|---|---|---|---|---|---|---|
|  | L | a | b | L | a | b |
| BW-SA034-E06-04A | 47.11 | 3.25 | 26.69 | 39.62 | 2.74 | 20.58 |
| BW-AL022-B24-03A | 32.09 | 6.79 | 18.94 | 23.0 | 7.8 | 12.41 |

SUMMARY OF DISCLOSURE

In summary of this disclosure, the present invention provided a process of producing a canola protein isolate of improved colour and taste by initially heat-inactivating myrosinase and other enzymes in the canola oil seeds prior to further processing of the oil seeds. Modifications are possible within the scope of this invention.

What we claim is:

1. A method of forming a canola protein isolate having a protein content of at least about 90 wt % from intact canola seeds which comprises:
    heat treating the intact canola oil seeds to deactivate enzymes therein,
    dehulling the canola oil seeds,
    removing canola oil from the heat treated and dehulled oil seeds to provide a canola oil seed meal, and
    processing the canola oil seed meal to recover therefrom the canola protein isolate,
    wherein said canola oil seed meal is processed to recover said canola protein isolate by the steps of:
        (i) extracting the canola oil seed meal with an aqueous salt solution to cause solubilization of canola protein in said the canola protein seed meal to form an aqueous canola protein solution having a pH of about 5 to about 6.8,
        (ii) separating the aqueous protein solution from residual canola oil seed meal,
        (iii) increasing the protein concentration of said aqueous protein solution while maintaining the ionic strength substantially constant by using a selective membrane technique to provide a concentrated protein solution,
        (iv) diluting the concentrated canola protein isolate into chilled water having a temperature of below about 15° C. to cause the formation of discrete protein particles in the aqueous phase in the form of micelles,
        (v) settling the protein micelles to form an amorphous, sticky, gelatinous, gluten-like protein micellar mass,
        (vi) recovering the protein micellar mass from supernatant, and
        (vii) processing the supernatant, on a batch, semi-continuous or continuous basis, to recover additional quantities of canola protein isolate therefrom.

2. The method of claim 1 wherein said heat treated and dehulled oil seeds are flaked prior to said oil removal step.

3. The method of claim 1, wherein said canola oil seed meal is produced by:
    heat treating the intact canola oil seeds to inactivate enzymes therein,
    cooling the heat treated canola oil seeds,
    cracking the hulls of the heat treated canola oil seeds,
    removing cracked hulls from canola seeds to produce canola meats, and removing canola oil from the canola meats by solvent extraction to leave a meal.

4. The method of claim 3 wherein an overs fraction and an unders fraction are separated from the cracked hulls, the overs fraction is recycled to the cracking and separation steps, the unders fraction is subjected to air aspiration for further removal of hulls and the recycled overs fraction and/or air aspirated unders fraction are flaked prior to said solvent extraction step.

5. The method of claim 1 wherein the canola oil seed meal is processed to recover therefrom a canola protein isolate having a protein content of at least about 100 wt % (N×6.25).

6. The method of claim 1 wherein said inactivation is effected by heating using steam.

7. The method of claim 1 wherein said inactivation is effected by heating using radio frequency radiation.

8. The method of claim 1, wherein said steps (i) to (vi) are effected on a batch basis and said extracting of said oil seed meal is effected using an aqueous salt solution having an ionic strength of at least about 0.10 and a pH of about 5 to about 6.8 and said aqueous protein solution has a protein content of about 5 to about 40 g/L.

9. The method of claim 1, wherein said steps (i) to (vi) are effected on a continuous basis and said extraction step is effected by:
   (i) continuously mixing an oil seed meal with an aqueous salt solution having an ionic strength of at least about 0.10 and a pH of about 5 to about 6.8 at a temperature of about 5° to about 65° C., and
   (ii) continuously conveying said mixture through a pipe while extracting protein from the oil seed meal to form an aqueous protein solution having a protein content of about 5 to about 40 g/L in a period of time up to about 10 minutes.

10. The method of claim 1, wherein following said separating of the aqueous protein solution from the residual canola seed meal, the aqueous protein solution is subjected to a pigment removal step.

11. The method of claim 10, wherein said pigment removal step is effected by daifiltration of the aqueous protein solution.

12. The method of claim 10, wherein said pigment removal step is effected by mixing a pigment adsorbing agent with the aqueous protein solution and subsequently removing the pigment adsorbing agent from the aqueous protein solution.

13. The method of claim 1, wherein said oil seed meal is extracted with water and subsequent thereto salt is added to the resulting aqueous protein solution to provide an aqueous protein solution having an ionic strength of at least about 0.10.

14. The method of claim 1, wherein said concentration step is effected by ultrafiltration to produce a concentrated protein solution having a protein content of at least about 200 g/L.

15. The method claim 1, wherein said concentrated protein solution is subjected to diafiltration using an aqueous salt solution of the same molarity and pH as the extracting solution.

16. The method of claim 15, wherein said diafiltration is effected until no further quantities of phenolics and visible colour are present in the permeate.

17. The method of claim 15, wherein said anti-oxidant is present in the diafiltration medium during at least part of the diafiltration step.

18. The method of claim 1, wherein the concentrated protein solution, optionally diafiltered, is subjected to a pigment removal step.

19. The method of claim 1, wherein the concentrated protein solution, optionally diafiltered, is subjected to a pasteurization step.

20. The method of claim 1, wherein the recovered protein micellar mass is dried to a proteinaceous powder.

21. The process of claim 1 wherein said additional quantities of protein isolate are recovered from the supernatant by concentrating the supernatant to a protein concentration of about 100 to about 400 g/L and drying the concentrated supernatant.

22. The process of claim 21 wherein said supernatant is concentrated to a concentration of about 200 to about 300 g/L.

23. The process of claim 1 wherein said additional quantities of protein isolate are recovered from the supernatant by concentrating the supernatant to a protein concentration of about 100 to about 400 g/L mixing the concentrated supernatant with the recovered protein micellar mass, and drying the mixture.

24. The process of claim 23 wherein said supernatant is concentrated to a concentration of about 200 to about 300 g/L.

25. The process of claim 1 wherein said additional quantities of protein isolate are recovered from the supernatant by concentrating the supernatant to a protein concentration of about 100 to about 400 g/L mixing a portion of said concentrated supernatant with at least a portion of the recovered protein micellar mass, and drying the resulting mixture.

26. The process of claim 25 wherein the remainder of the concentrated supernatant is dried and any remainder of the recovered protein micellar mass is dried.

27. The process of claim 25 wherein said supernatant is concentrated to a concentration of about 200 to about 300 g/L.

\* \* \* \* \*